United States Patent
Golov

(10) Patent No.: US 12,046,020 B2
(45) Date of Patent: *Jul. 23, 2024

(54) LIGHTWEIGHT ARTIFICIAL INTELLIGENCE LAYER TO CONTROL THE TRANSFER OF BIG DATA

(71) Applicant: Lodestar Licensing Group, LLC, Evanston, IL (US)

(72) Inventor: Gil Golov, Backnang (DE)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,052

(22) Filed: Sep. 19, 2022

(65) Prior Publication Data

US 2023/0019621 A1    Jan. 19, 2023

Related U.S. Application Data

(63) Continuation of application No. 16/836,562, filed on Mar. 31, 2020, now Pat. No. 11,451,480.

(51) Int. Cl.
*H04L 47/24* (2022.01)
*G06F 18/214* (2023.01)
(Continued)

(52) U.S. Cl.
CPC .......... *G06V 10/764* (2022.01); *G06F 18/214* (2023.01); *G06V 10/774* (2022.01);
(Continued)

(58) Field of Classification Search
CPC ..... H04L 47/127; H04L 47/24; H04L 47/823; H04L 47/83; G06V 10/764; G06V 10/774; G06V 10/82; G06V 20/49; G06F 18/214
(Continued)

(56) References Cited

U.S. PATENT DOCUMENTS 10,708,624 B1 * 7/2020 Saeedi ................. H04N 19/50
11,451,480 B2    9/2022 Golov
(Continued)

FOREIGN PATENT DOCUMENTS

KR    101864286    7/2018

OTHER PUBLICATIONS

International Search Report and Written Opinion, PCT/US2021/019529, mailed on Jun. 17, 2021.
(Continued)

*Primary Examiner* — Robert J Lopata
(74) *Attorney, Agent, or Firm* — Greenberg Traurig

(57) ABSTRACT

Methods, systems, and apparatuses related to reducing network congestion by analyzing data using a lightweight artificial intelligence (AI) layer prior to transmission are described. An AI model may predictively select data that need not be transmitted and, in some embodiments, further process data to be transmitted. As a result, the total size and amount of data transmitted over the network can be reduced, while the data needs of the receiving device can still be met. For example, data generated by a source application may be received and input into a predictive model, which may generate a prediction output for the data. The data may be pre-processed using a strategy selected based on the prediction output, and the pre-processed data may be transmitted over a network to a server.

17 Claims, 5 Drawing Sheets

(51) Int. Cl.
  *G06V 10/764* (2022.01)
  *G06V 10/774* (2022.01)
  *G06V 10/82* (2022.01)
  *G06V 20/40* (2022.01)
  *H04L 47/127* (2022.01)
  *H04L 47/70* (2022.01)

(52) U.S. Cl.
  CPC .............. *G06V 10/82* (2022.01); *G06V 20/49* (2022.01); *H04L 47/127* (2013.01); *H04L 47/24* (2013.01); *H04L 47/823* (2013.01)

(58) Field of Classification Search
  USPC .......................................................... 370/235
  See application file for complete search history.

(56) References Cited

U.S. PATENT DOCUMENTS

| | | | |
|---|---|---|---|
| 2011/0182352 A1* | 7/2011 | Pace | H04N 19/543 375/240.1 |
| 2012/0263241 A1* | 10/2012 | Swenson | H04N 19/132 375/E7.2 |
| 2017/0308800 A1* | 10/2017 | Cichon | G06N 20/00 |
| 2018/0158078 A1 | 6/2018 | Hsieh et al. | |
| 2018/0322234 A1* | 11/2018 | Cao | G06F 30/398 |
| 2019/0236453 A1 | 8/2019 | Zhu et al. | |
| 2019/0286541 A1* | 9/2019 | Sobala | G06F 11/3447 |
| 2019/0311291 A1 | 10/2019 | Kim et al. | |
| 2019/0340524 A1 | 11/2019 | Kirchhoff et al. | |
| 2019/0354849 A1 | 11/2019 | Tran et al. | |
| 2020/0035362 A1* | 1/2020 | Abou Shousha | G16H 50/70 |
| 2020/0210817 A1* | 7/2020 | Chatterjee | G06N 3/044 |
| 2020/0226797 A1* | 7/2020 | Schroers | H04N 19/50 |
| 2020/0320289 A1* | 10/2020 | Su | G06F 18/214 |
| 2020/0366340 A1* | 11/2020 | Zhang | H04B 7/0617 |
| 2020/0394415 A1* | 12/2020 | Aoki | G06T 7/0002 |
| 2021/0019614 A1 | 1/2021 | Hihn et al. | |
| 2021/0065577 A1* | 3/2021 | Daniali | G09B 19/003 |
| 2021/0103720 A1 | 4/2021 | Kim et al. | |
| 2021/0132584 A1 | 5/2021 | Bae | |
| 2021/0142195 A1* | 5/2021 | Osogami | G06N 7/00 |
| 2021/0174229 A1* | 6/2021 | Lim | G16H 10/60 |
| 2021/0182708 A1* | 6/2021 | Park | G06N 20/00 |
| 2021/0182713 A1* | 6/2021 | Kar | G06V 10/764 |
| 2021/0185273 A1* | 6/2021 | Pitts | G11B 27/34 |
| 2021/0200749 A1* | 7/2021 | Sghiouer | G06F 16/215 |
| 2021/0232933 A1 | 7/2021 | Gu et al. | |
| 2021/0287782 A1* | 9/2021 | Vadali | G16H 40/67 |
| 2021/0306270 A1 | 9/2021 | Golov | |
| 2022/0021887 A1* | 1/2022 | Banerjee | H04N 19/115 |

OTHER PUBLICATIONS

Lightweight Artificial Intelligence Layer to Control the Transfer of Big Data, U.S. Appl. No. 16/836,562, filed Mar. 31, 2020, Gil Golov.

Chow, Kit-Yee, et al., "Efficient Selective Image Transmission in Visual Sensor Networks." IEEE VTS Vehicular Technology Conference, IEEE, Apr. 1, 2007.

Extended European Search Report, EP21779002.1, mailed on Feb. 12, 2024.

* cited by examiner

LIGHTWEIGHT ARTIFICIAL INTELLIGENCE LAYER TO CONTROL THE TRANSFER OF BIG DATA

RELATED APPLICATIONS

The present application is a continuation application of U.S. patent application Ser. No. 16/836,562 filed Mar. 31, 2020, the entire disclosures of which application are hereby incorporated herein by reference.

FIELD OF THE TECHNOLOGY

The disclosed embodiments are directed towards big data processing systems and to lightweight artificial intelligence systems for distributed data reduction.

BACKGROUND

To improve the performance and accuracy of machine learning (ML) or artificial intelligence (AI) models, significant amounts of training data are needed. In general, the more training data collected, the better the performance of such models. As another example, raw audio data is often captured by digital home assistants and used as training data to improve speech detection. Similarly, video data from autonomous and non-autonomous vehicles can be collected and used as training data to improve computer vision systems.

BRIEF DESCRIPTION OF THE DRAWINGS

The embodiments are illustrated by way of example and not limitation in the figures of the accompanying drawings in which like references indicate similar elements.

DETAILED DESCRIPTION

Disclosed are embodiments for intelligently pre-processing big data for transmission over a network. In brief, the disclosed embodiments describe a lightweight artificial intelligence (AI) layer that analyzes data prior to transmission over a network. The AI model predictively selects data that need not be transmitted and, in some embodiments, further processes data to be transmitted. As a result, the total size and amount of data transmitted over the network can be reduced, while the data needs of the receiving device can still be met.

Other systems may rely on bulk data collection. Such systems ignore the size of data transmitted over network and emphasize storage size, often employing large warehouse-scale computing architectures. However, these systems often collect more noise than signal. The resulting collection technique significantly "clogs" bandwidth of networks, a problem that is exacerbated by lower bandwidth networks such as cellular networks. However, such systems may make no attempt to reduce the amount of data as such a reduction would reduce the total amount of data collected and potentially weaken the training process.

The disclosed embodiments solve these and other technical problems by providing a lightweight AI layer at a data source and selectively transmitting training data to remote server based on the classification undertaken by the AI layer.

Figure 1A:
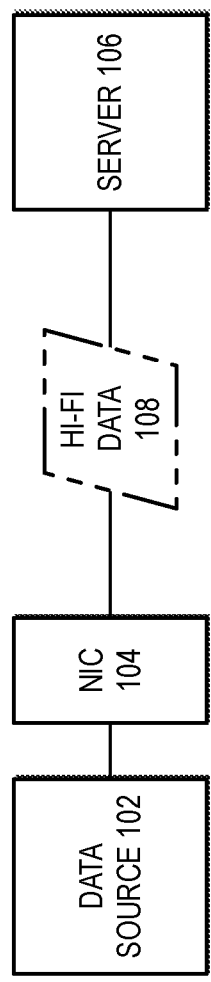
FIG. 1A is a block diagram of a network computer system according to some embodiments of the disclosure.

FIG. 1A is a block diagram of a network computer system according to some embodiments of the disclosure.

Figure 5:
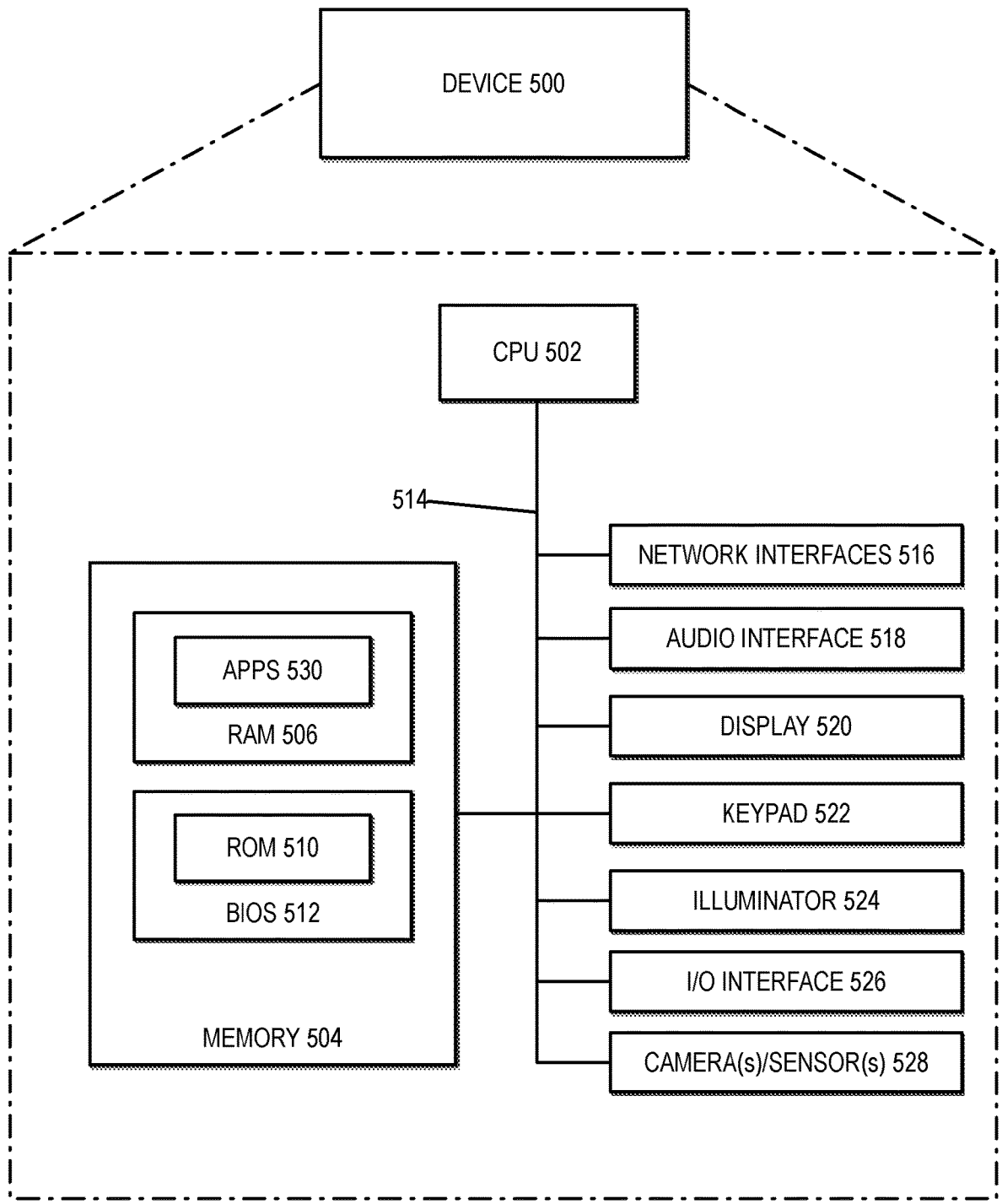
FIG. 5 is a block diagram of a computing device according to some embodiments of the disclosure.

In the illustrated embodiment, a data source (102) transmits hi-fidelity data (108) to a server (106) using a network interface card (NIC) (104). In the illustrated embodiment, the data source (102) can comprise any computing device capable of generating data. Examples of data sources (102) comprise personal computing devices (desktops, laptops, etc.), mobile computing devices, Internet-of-Things (IoT) devices, server computing devices, automotive computing devices, and generally any type of computing device (as depicted in FIG. 5). In some embodiments, data source (102) comprises software running such a computing device as well as the device itself. For example, data source (102) may comprise software for capturing videos or images using a camera (not illustrated).

In the illustrated embodiment, data generated by the data source (102) is transmitted using a NIC (104). No limitation is placed on the type or design of the NIC (104). Generally, the NIC (104) is responsible for interacting with the lower level details of the communications channel. In some embodiments, the NIC (104) interfaces with a wired channel (e.g., Ethernet) or with a wireless channel (e.g., Wi-Fi, cellular, satellite, etc.). Although illustrated as a single NIC (104), a data source (102) may have multiple NICs. Alternatively, or in conjunction with the foregoing, the NIC (104) may be configured to communicate over multiple disparate data channels. Alternatively, or in conjunction with the foregoing, the NIC (104) may be configured to handle multiple connections over a single communications channel.

In the embodiment illustrated in FIG. 1A, the NIC (104) is primarily responsible for routing data from the data source (102) to the channel connecting to the server (106). In the illustrated embodiment, the NIC (104) can comprise a commercial off-the-shelf (COTS) NIC that simple packages the data generated by the data source (102) and transmit the data (108) over the network. As illustrated, this data (108) is referred to as high-fidelity ("hi-fi") data but may also be referred to as "big data." Generally, hi-fi data (108) comprises raw or full-featured data generated by the data source (102). As one example, if the data source (102) comprises a video recording application, the hi-fi data (108) may comprise full frame data captured by the data source (102). Alternatively, if the data source (102) is a personal home assistant, the hi-fi data (108) may comprise raw speech (i.e., audio) data. Alternatively, if the data source (102) comprises an IoT device, the hi-fi data (108) may comprise raw sensor readings. Notably, in some embodiments, the hi-fi data (108) comprises a high volume of data or a large velocity of data. In some embodiments, a high volume is accumulated due to the large file sizes generated by the data source (102). A common example of a high-volume data source (102) comprises a video application. In some embodiments, a high-velocity is generated due to the speed at which data is generated. Examples of high-velocity data sources are automobile systems and IoT devices or networks. In some embodiments, the data source (102) may also be a highly variable data source. In this scenario, the data source (102) may be generating various types of content. Thus, in some embodiments, the data source (102) may generate high-volume data and high-velocity data. An example of this type of data source (102) can also comprise a vehicle or IoT system when such a system has multiple data generators (e.g., automotive systems combined with computer visions systems or a home network of disparate IoT devices).

In the illustrated embodiment, the NIC (104) or data source (102) may perform rudimentary operations on the hi-fi data (108) before transmitting such as naïve compression of the data using gzip or similar algorithms. However, even if such an approach slightly reduces the size of data over the network, it fails to adequately limit the transmitted data to only that data needed by the server (106). For example, compressing all data may reduce the total volume but still results in a relatively large volume (and high-velocity in some instances) of data. Moreover, compression of variable data may be of limited use given the structure of the data. Further, some server applications require full-featured to hi-resolution data and thus compression is undesirable due to risks of visual artifacts and other network transmission or compression anomalies.

As illustrated, the server (106) receives data from the data source (102). In various embodiments described in more detail herein, the server (106) can comprise one or more applications for training a machine learning algorithm or AI algorithm. For example, the server may use data from the data source (102) to train an artificial neural network (ANN). Other types of neural networks may be used such as a convolutional neural network (CNN), recurrent neural network (RNN), auto encoder, etc. Alternatively, or in conjunction with the foregoing, other non-neural network models may be used such as a support vector machine (SVM), decision tree, or naïve Bayes classifier. No limit is placed on the type and number of models trained by the server (106).

Figure 1B:
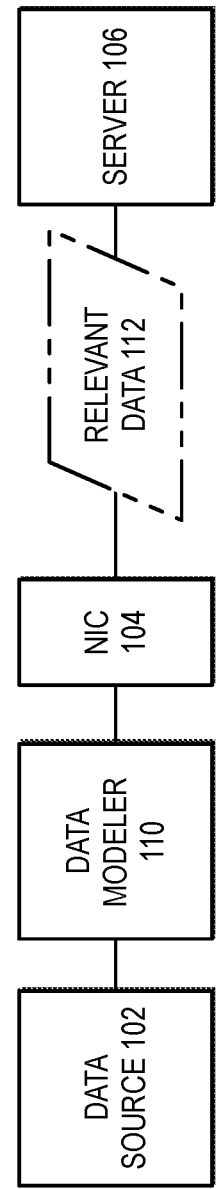
FIG. 1B is a block diagram of an improved network computer system according to some embodiments of the disclosure.

FIG. 1B is a block diagram of an improved network computer system according to some embodiments of the disclosure.

As in FIG. 1A, the system illustrated in FIG. 1B includes a data source (102), NIC (104), and server (106). These components operate similarly or identically to those described in FIG. 1A, subject to the modifications described herein. Reference is made to FIG. 1A for additional details on these components (102, 104, 106) and those details are not repeated herein.

As illustrated, a data modeler (110) is situated between a data source (110) and NIC (104). In some embodiments, the data modeler (110) comprises a dedicated hardware device that mediates data transferred between the data source (102) and NIC (104), an ultimately server (106). For example, the data modeler (110) may comprise a lightweight artificial intelligence accelerator. In other embodiments, the data modeler (110) comprises a software application running on the data source (102). For example, the data modeler (110) can be implemented as part of a network driver. Alternatively, the data modeler (110) can comprise a dynamically-linked library object that can be used selectively by applications on the data source (102). In yet another embodiment, the data modeler (110) may be implemented on the NIC (104). As with other embodiments, if the data modeler (110) is implemented on the NIC (104) it may be implemented as a hardware co-processor or as a software or firmware application.

In the illustrated embodiment, the data modeler (110) receives raw data (e.g., hi-fi data) from the data source (110) and selectively transfers relevant data (112) to the server (106) via the NIC (104). Indeed, in some scenarios relevant data (112) may comprise hi-fi data (108). As will be described, relevant data (112) comprises data that if of variable volume, velocity, and variability based on the output of an AI model implemented in the data modeler (110). In some embodiments, the data modeler (110) may predict that a data payload should be transmitted without change, thus the NIC (104) will transmit high-fidelity data as the relevant data (112). In other embodiments, the data modeler (110) may modify the high-fidelity data to generate new data that represents only a portion of the high-fidelity data or comprises a compressed version of the high-fidelity data. The NIC (104) then transmits this portion or compressed data as the relevant data (112). Examples of this operation include extracting a subset of video frames that include objects of interest and removing background pixels. In some embodiments, the data modeler (110) may discard data completely, resulting in no relevant data (112) being transmitted over the network. Examples of this operation include the predictive exclusion of extraneous log data transmitted by IoT devices or images that do not contain objects of interest as predicted by a predictive model.

As discussed in FIG. 1A, the server (106) may use data from the data source to train one or more ML/AI models. In the illustrated embodiment, the model(s) trained by the server (106) may comprise the model used by the data source (102). In this embodiment, the server (106) can continuously re-train the model and periodically update the data modeler (110) to use the re-trained model. In this manner, the server (106) and data source (102) are self-reinforcing.

Figure 2:
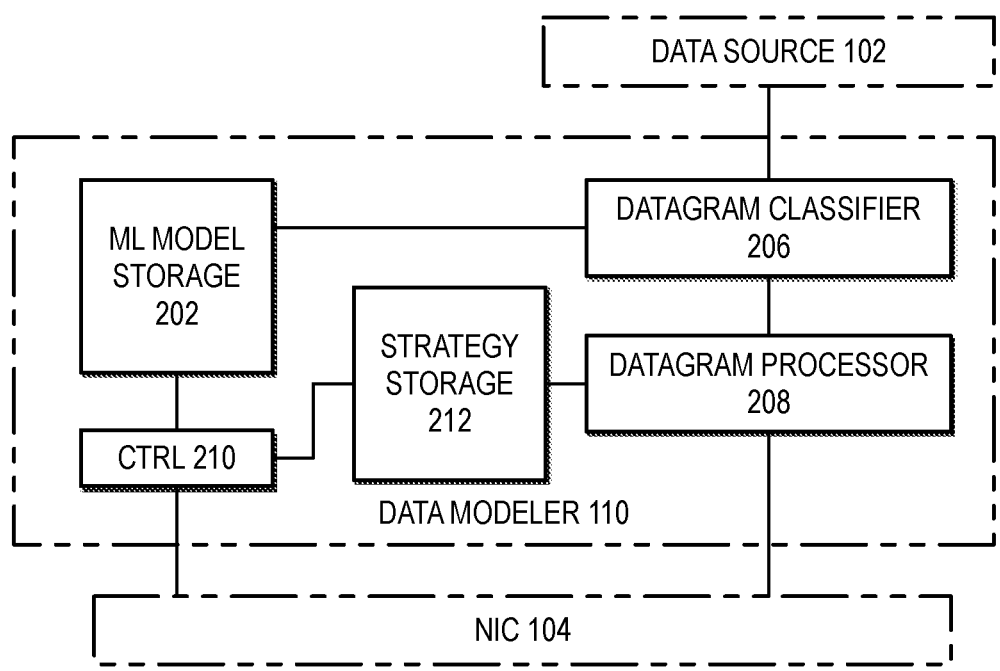
FIG. 2 is a block diagram illustrating a data modeler according to some embodiments of the disclosure.
Figure 3:
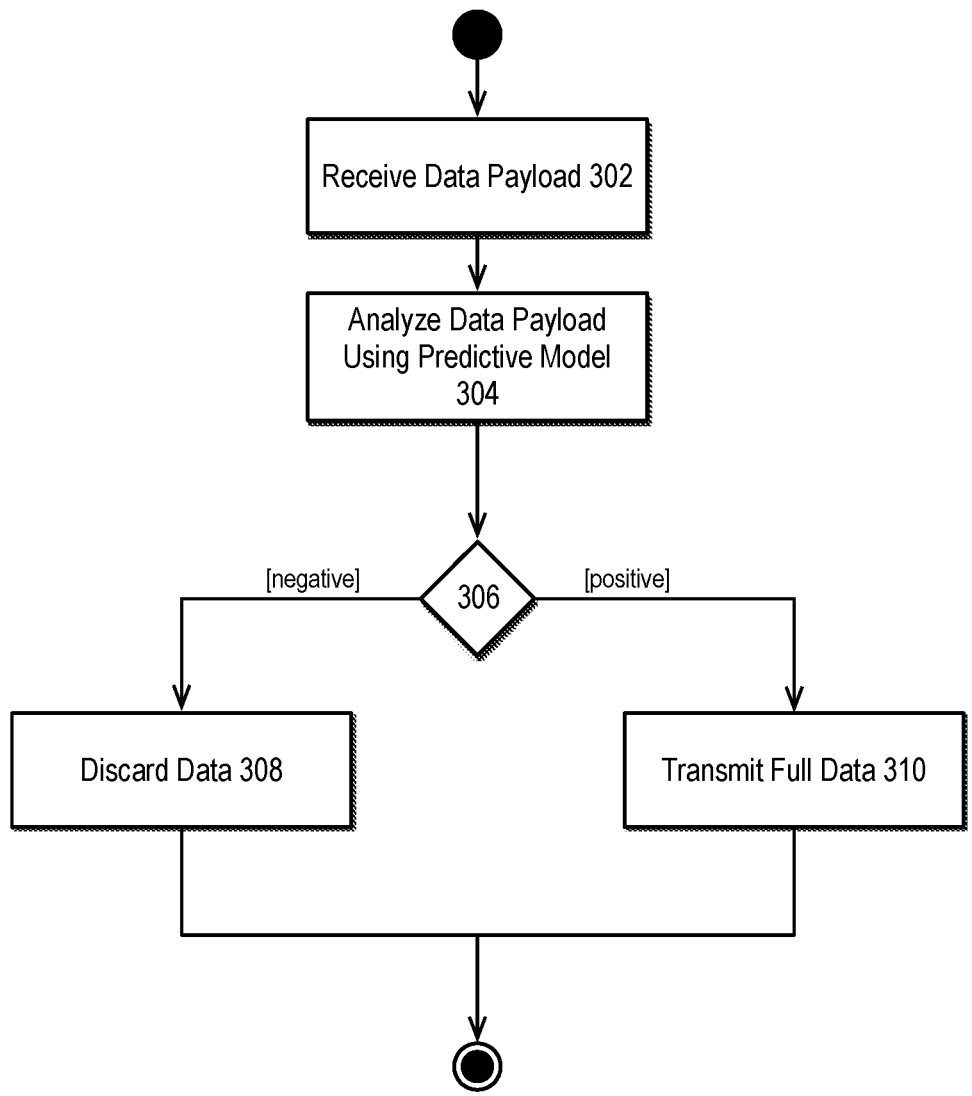
FIG. 3 is a flow diagram illustrating a method for using a lightweight AI layer to selectively transmit training data according to some embodiments of the disclosure.
Figure 4:
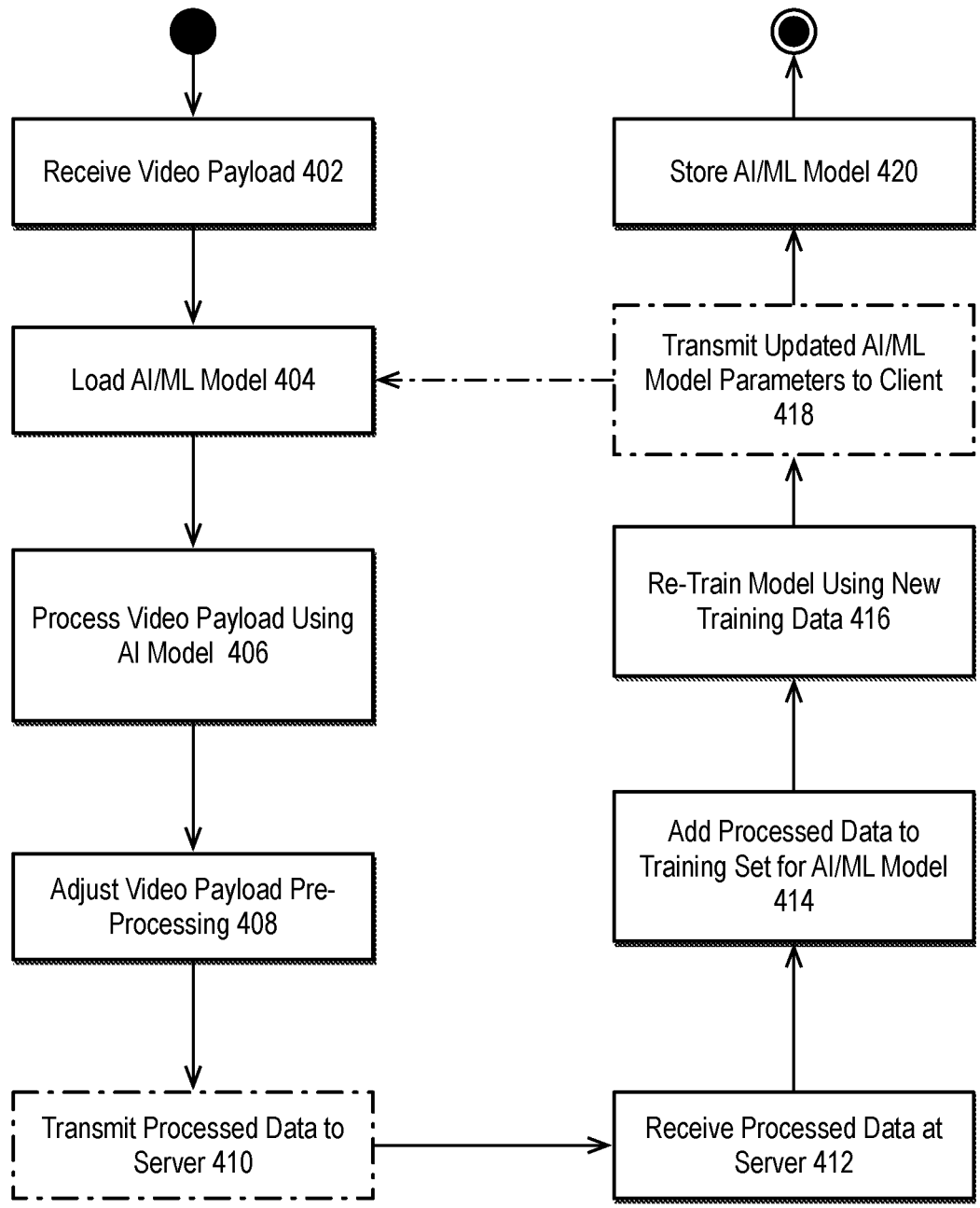
FIG. 4 is a flow diagram illustrating a method for using a lightweight AI layer to selectively transmit video training data according to some embodiments of the disclosure.

Embodiments of the structure of the data modeler (110) are described in more detail in FIG. 2 and operations of the data modeler (110) are described in more detail in FIGS. 3 and 4. The description accompanying these figures is not repeated herein but is incorporated in its entirety.

FIG. 2 is a block diagram illustrating a data modeler according to some embodiments of the disclosure.

In the illustrated embodiment, data source (102) and NIC (104) comprise the correspondingly identified elements in FIG. 1B, the description of which is not repeated herein. In the illustrated embodiment, a data modeler (110) comprises a datagram classifier (206), a datagram processor (208), ML model storage (202), and a controller (110).

In the illustrated embodiment, the datagram classifier (206) receives raw data generated by the data source (102). Examples of such raw data includes sensor data, image data, video data, audio data, and generally any type of data. The datagram classifier (206) loads model parameters from the ML model storage (202). In some embodiments, the ML model storage (202) stores model parameters such as neural network coefficients, hyperparameters (e.g., the number of hidden layers, learning rate, activation functions, etc.), and strategies (e.g., data normalization, regularization, etc.). In the illustrated embodiment, the datagram classifier (206) loads these parameters and initializes the predictive model (e.g., ML model).

In some embodiments, the ML model storage (202) includes multiple sets of model parameters and other values. In some embodiments, these multiple models may correlate to different types of data. Thus, the ML model storage (202) may include a model for processing video data, model for processing sensor data, a model for processing audio data, etc. Further, the models may be associated with individual applications; thus, the ML model storage may have a model for video data captured by certain type of camera (or certain orientation) and a second model for another model of camera (or another orientation). The datagram classifier (206) is then configured to identify a source of the data and select the appropriate model stored in the ML model storage (202).

Then, when receiving raw data, the datagram classifier (206) inputs the raw data into the ML model and receives a predicted output. The type of content of the predicted output varies depending on the model used, as will be described below. The datagram classifier (206) transmits the model output, the raw data, and an identifier of the model used to datagram processor (208).

The datagram processor (208) identifies a processing strategy stored in a strategy storage device (212) based on the model and data. In some embodiments (not illustrated), the datagram processor (208) stores a plurality of processing strategies that may be selected and run on the received data based on the output of the ML model. In some embodiments, the ML models are agnostic to the processing strategy and instead output a predicted data value.

In some embodiments, the processing strategies may comprise a set of rules for determining when to transmit raw data over the network. In these embodiments, the strategies use the confidence output of the ML models as a threshold for determining when to transmit data. For example, when performing object detection, if the classifier (206) does not detect any objects (or detects objects with a very low confidence), the strategies can instruct the processor (208) to drop the data from transmission. Alternatively, if the classifier (206) detects one or more objects with sufficient confidence, the processor (208) can stream the data to the server over the NIC (104). Thus, only useful data is transmitted.

As another example, when processing video data, the strategy may adjust a compression level or other processing step based on the ML model output. For example, if the model predicts that no objects are present in video data, the processor (208) may apply a high compression algorithm to the data. Alternatively, if the ML model predicts an object is present, the processor (208) can apply a low compression to the video data or even transmit raw data over the network.

The data modeler (110) additionally includes a controller (210). In the illustrated embodiment, the controller (210) coordinates the operation of the data modeler. In a software-based implementation, the controller (210) can comprise a supervisor process or similar process that spawns the other processes. In a hardware implementation, the controller (210) can comprise a dedicated microcontroller that runs a dedicated firmware for managing the modeler (110). In the illustrated embodiment, the controller (210) primarily manages the model storage (202) and the strategy storage (212).

In the illustrated embodiment, processing strategies and models may be updated by a remote computing device and transmitted to the modeler (110) via the controller (210). The controller (210) can then update the models and strategies stored in the respective storage devices (202, 212). In some embodiments, the data modeler (110) can be self-reinforcing. That is, the models stored in the storage (202) can be trained by a remote server (e.g., 106) using training data generated by the classifier and the processor (206). Continuing the object detection example, the ML model comprises a general model for identifying objects in any image. This model may be continuously retrained by a central, remote server. The data modeler (110) may be implemented in a vehicle, which is constantly generating potential training data. However, for training purposes, every frame is generally not needed to fine tune the model weighting. Thus, the vehicle preemptively omits to transmits the images to generate relevant data training data for transmission to the server. The server then uses these relevant images as training data and after re-training the model, transmits the updated model back to the vehicle.

Notably, in the illustrated embodiment, the ML models implemented in the modeler (110) are lightweight AI models. That is, the ML models are designed to be executed on minimal hardware and are low-complexity software as compared to more sophisticated AI frameworks operating at a central server or warehouse.

FIG. 3 is a flow diagram illustrating a method for using a lightweight AI layer to selectively transmit training data according to some embodiments of the disclosure.

In block 302, the method receives a data payload. As described above, this data payload may be generated by a computing device or system. In some embodiments, the data payload comprises image data, video data, sensor data, etc. In general, any data may be received in block 302. In some embodiments, the data received may comprise data to be transmitted to a server for AI training purposes. In these embodiments, the method may only be executed prior to such transmissions and may be bypassed for all other transmissions.

In block 304, the method analyzes the data payload using a predictive model.

In one embodiment, the predictive model comprises an ML or AI model. In some embodiments, the model may comprise an artificial neural network, recurrent neural network, convolutional neural network, or other type of neural network.

In the illustrated embodiment, the method executes block 304 using a lightweight AI/ML layer. In some embodiments, the lightweight AI/ML layer may comprise a software-oriented AI/ML layer operating on commodity hardware. In some embodiments, the lightweight AI/ML layer may comprise a generic AI/ML system that is not fine-tuned based on extensive training. For example, a commercial off-the-shelf (COTS) classifier may be used as the lightweight AI/ML layer whereas a centralized AI/ML layer may comprise a finely tuned neural network. Various examples of distinctions between a light weight and heavy AI/ML layer are provided below.

In one embodiment, a lightweight AI/ML layer comprises a single-stage object detector. In this scenario, the lightweight AI/ML layer may comprise a You Only Look Once ("YOLO") model, single shot detector (SSD) model, RetinaNet, or similar single stage object detection model. In contrast, a heavy AI/ML may comprise two-stage object detection model such as a regional CNN (R-NN), Fast or Faster R-CNN, or other similar complex model. In general, a more complex model will include a region proposal stage where as the lightweight AI/ML layer will not. Notably, both models attempt to predict the same general output. However, the lightweight AI/ML layer is designed to be as fast as possible with the acceptance of a higher false positive rate. In general, the primary objective of block 304 is to filter clearly erroneous false positives from further training, which improves the speed of the training of a heavier AI/ML layer. While described primarily in the context of object detection, the principals can be extended to other AI/ML layers.

In the illustrated embodiment, the output of the predictive model will generally comprise a classification or result and a confidence level. For example, in the object detection scenario, the predictive model will output coordinates of bounding boxes of objects and a confidence level regarding the accuracy of a prediction.

In block 306, the method determines if the prediction was positive or negative. A positive or negative prediction may be dependent on the type of model used. For example, a binary classifier outputs either a positive or negative classification (versus the output of an objection detection model). However, the general principals apply to all ML models.

In block 308, the method discards the data if the output is negative. As used herein a negative prediction can refer to the ML model predicting that the input data does not match what the model is attempting to predict. For example, in the object detection scenario, a negative prediction means that no objects were detected. Alternatively, or in conjunction with the foregoing, a negative prediction may mean a prediction that has a confidence level below a cutoff threshold. Thus, in the previous example, if the model predicts that an object exists in an image but the confidence of that prediction is below a threshold, the method may discard the data. As will be described in FIG. 4, in some embodiments, the method may instead process the data instead of discarding the data by, for example, compressing the data.

In block 310, the method alternative transmits the full data if the prediction is positive. As used herein a positive prediction can refer to the ML model predicting that the input data matches what the model is attempting to predict. For example, in the object detection scenario, a positive prediction means that at least one object was detected. Alternatively, or in conjunction with the foregoing, a positive prediction may mean a prediction that has a confidence level above the cutoff threshold. Thus, in the previous example, if the model predicts that an object exists in an image and the confidence of that prediction is above a threshold, the method may transmit the date. In some embodiments, the method transmits the raw data as received in block 302. Alternatively, the method may vary a compression level to reduce the amount of compression to positive detections.

In the illustrated method, a lightweight ML/AI model is used to quickly classify data to transmit to a central server. If the lightweight ML/AI model predicts that the data is of interest (due to a positive prediction), the method can transmit the data to the server. Conversely, if the lightweight ML/AI model predicts that the data is not useful (due to a negative prediction), the method can discard the data, thus saving network bandwidth and server-side computational resources.

FIG. 4 is a flow diagram illustrating a method for using a lightweight AI layer to selectively transmit video training data according to some embodiments of the disclosure.

In block 402, the method receives a video payload. In one embodiment, the video payload comprises one or more image frames constituting a video. In one embodiment, the video data may comprise streaming video data generated by an automobile camera. In another embodiment, the video data may comprise video data from a security camera or similar camera. The specific source of video data is not limiting.

In block 404, the method loads an AI/ML model. In the illustrated embodiment, the AI/ML model comprises a lightweight AI/ML model as described previously. In some embodiments, the AI/ML model is implemented in software and loading the AI/ML model comprises loading the parameters defining the model from a storage device.

In block 406, the method processes the video payload using the lightweight AI/ML model. In one embodiment, the processing of the video payload using the AI/ML model comprises performing object detection on the video payload.

In some embodiments, the object detection comprises generating a set of bounding boxes that include non-background objects (e.g., persons, vehicles, etc.). As described above, the output may comprise zero or more predictions and a confidence level with each. In the object detection example, the predictions comprise bounding boxes capturing objects.

In block 408, the method adjusts the video payload pre-processing based on prediction generated in block 406. Various adjustments may be made, as described herein.

In a first adjustment, the method may discard the video payload. In this scenario the method ends after block 408. In one embodiment, the method discards the video payload when no predictions were made in block 406. For example, if the lightweight AI/ML model does not predict any objects exist in the video payload, the number of predictions is zero. In another embodiment, the method may discard the video payload unless a prediction having a confidence level exceeding a trigger threshold exists.

In a second adjustment, the method may adjust a compression level of the video data based on the prediction output. For example, if the lightweight AI/ML model predicts no objects, the method may apply a maximum compression to the video payload. If the lightweight AI/ML model predicts objects having low confidence levels, the method may apply a medium compression to the video payload. If the lightweight AI/ML model predicts objects with a high confidence level, the method may apply low compression or, in some embodiments, no compression, to the video payload.

In one embodiment, the method may bypass block 408 if the lightweight AI/ML model outputs a prediction having a high confidence level. In this scenario, the lightweight AI/ML model reasonably predicts that the video payload has useful information. For example, if the lightweight AI/ML model predicts that the video payload includes objects with a high confidence level, the method may bypass block 408 and proceed directly to block 410.

In block 410, the method transmits the processed data to a server. In some embodiments, discussed above, this step is option. If optional, the method ends. In the illustrated embodiment, the method transmits either the unprocessed video data or processed video data as described above in the description of block 408. In the illustrated embodiment, the method transmits the data using a NIC or similar device.

In block 412, a server receives the processed data. As discussed above, in some embodiments, the processed data may comprise raw video payload data or may comprise a compressed version of the same video payload. Both types of data are referred to as "processed data."

In block 414, the method adds the processed data to a training data set for a heavy AI/ML model. As described above, the heavy AI/ML model may comprise a more complex model used to predict the same output as predicted in block 406. That is, in both blocks, the model involved is used to perform the same function; however, the server-side AI/ML model comprises a more sophisticated algorithm for performing the function. As one example, the server-side model may utilize optimized hardware (e.g., TPUs or GPUs) and includes sufficient storage and processing power to continuously train and re-train a model. In the illustrated embodiment, the method maintains a storage device (or network of storage devices) that stores the training data for training the server-side model. In block 414, the method inserts the received data into this corpus. In some embodiments, the method receives the output of the lightweight AI/ML model as part of the processed data and stores this output with the processed data.

In block 416, the method retrains the server-side model using the received processed data. In the illustrated embodiment, the retraining may be performed in any manner known in the art of retraining predictive models such as neural networks. In general, each of the processed data entries stored in block 414 are combined into a training corpus and used to train a model offline.

In block 418, the method transmits the updated model parameters after training to the client. In some embodiments, this step is optional. In embodiments where block 418 is executed, the lightweight AI/ML model and server-side AI/ML may comprise similar models and thus can re-use parameters. For example, a two-stage model on the server may transmits the one-stage parameters to the client for use in a lightweight one-stage model. In other embodiments, however, block 418 is not executed as the models are tuned in different manners and have different parameters.

In an alternative embodiment, the method may simultaneously train a server-side copy of the lightweight AI/ML model along with the heavier server-side model. In this scenario, the method can update the entire lightweight AI/ML model using the results of the server-side training of the lightweight AI/ML model.

In block 420, the method stores the server-side lightweight AI/ML model. If the method generates a server-side lightweight AI/ML model, the method stores that model as well. Storage of AI/ML models is well known and any type of storage mechanism may be used to store such models.

FIG. 5 is a block diagram of a computing device according to some embodiments of the disclosure.

Processing device can include many more or fewer components than those shown in FIG. 5. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 5 can be implemented as a virtual machine while in other embodiments the device can be implemented as a physical machine. In some embodiments, the device is implemented as both, with a virtual machine running on the device depicted in FIG.

As shown in FIG. 5, device (500) includes processing units (CPUs) (502) in communication with a mass memory (504) via a bus (514). Device (500) also includes one or more network interfaces (516), an audio interface (518), a display (520), a keypad (522), an illuminator (524), an input/output interface (526), and a camera(s) or other optical, thermal or electromagnetic sensors (528). Device (500) can include one camera/sensor (528), or a plurality of cameras/sensors (528), as understood by those of skill in the art.

Device (500) can optionally communicate with a base station (not shown), or directly with another computing device. Network interface (516) includes circuitry for coupling device (500) to one or more networks and is constructed for use with one or more communication protocols and technologies. Network interface (516) is sometimes known as a transceiver, transceiving device, or network interface card (NIC).

Audio interface (518) is arranged to produce and receive audio signals such as the sound of a human voice. For example, audio interface (518) can be coupled to a speaker and microphone (not shown) to enable telecommunication with others and generate an audio acknowledgment for some action. Display (520) can be a liquid crystal display (LCD), gas plasma, light emitting diode (LED), or any other type of display used with a computing device. Display (520) can also include a touch sensitive screen arranged to receive input from an object such as a stylus or a digit from a human hand.

Keypad (522) can comprise any input device arranged to receive input from a user. For example, keypad (522) can include a push button numeric dial, or a keyboard. Keypad (522) can also include command buttons that are associated with selecting and sending images. Illuminator (524) can provide a status indication and provide light. Illuminator (524) can remain active for specific periods of time or in response to events. For example, when illuminator (524) is active, it can backlight the buttons on keypad (522) and stay on while the device (500) is powered. Also, illuminator (524) can backlight these buttons in various patterns when actions are performed, such as dialing another processing device. Illuminator (524) can cause light sources to illuminate in response to actions while positioned within a transparent or translucent case of the device (500).

Device (500) also comprises input/output interface (526) for communicating with external devices not shown in FIG. 5. Input/output interface (526) can utilize one or more communication technologies, such as USB, infrared, Bluetooth™, or the like.

Mass memory (504) includes a RAM (506), a ROM (510), and other storage means. Mass memory (504) illustrates another example of computer storage media for storage of information such as computer-readable instructions, data structures, program modules or other data. Mass memory (504) stores a basic input/output system ("BIOS") (512) for controlling low-level operation of processing device (500). The mass memory can also store an operating system for controlling the operation of processing device (500). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs. Memory (504) includes one or more software applications (530) for implementing some or all of the methods described above.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors, and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. An apparatus comprising:
   a processor; and
   a storage medium for tangibly storing thereon program logic for execution by the processor, the stored program logic causing the processor to perform operations of:
   receiving video data generated by a source application;
   inputting the data into a predictive model, the predictive model generating a prediction output for the data;
   identifying a subset of frames in the video data based on the prediction output;
   retaining the subset of frames as pre-processed data and discarding a remainder of frames; and
   transmitting the pre-processed data over a network to a server for processing of the data.

2. The apparatus of claim 1, wherein inputting the data into a predictive model comprises inputting the data into a lightweight machine learning model.

3. The apparatus of claim 1, wherein the predictive model comprises one of a You Only Look Once ("YOLO") model or single shot detector (SSD) model.

4. The apparatus of claim 1, the operations further comprising selecting a compression level based on the prediction output and compressing the second portion of the pre-processed data based on the compression level.

5. The apparatus of claim 1, the operations further comprising:
   identifying a plurality of areas in video data;
   cropping the video data based on the plurality of areas; and
   using the cropped video data as the pre-processed data.

6. A method comprising:
   receiving video data generated by a source application;
   inputting the video data into a predictive model, the predictive model generating a prediction output for the data;
   identifying a subset of frames in the video data based on the prediction output;
   retaining the subset of frames as pre-processed data and discarding a remainder of frames; and
   transmitting the pre-processed data over a network to a server for processing of the data.

7. The method of claim 6, wherein inputting the data into a predictive model comprises inputting the data into a lightweight machine learning model.

8. The method of claim 6, wherein the predictive model comprises one of a You Only Look Once ("YOLO") model or single shot detector (SSD) model.

9. The method of claim 6, further comprising selecting a compression level based on the prediction output and compressing the second portion of the pre-processed data based on the compression level.

10. The method of claim 6, further comprising receiving video data, wherein the source application comprises a video capture application or a video compression application, or both.

11. The method of claim 10, further comprising:
    identifying a plurality of areas in the video data;
    cropping the video data based on the plurality of areas; and
    using the cropped video data as the pre-processed data.

12. A non-transitory computer-readable storage medium for tangibly storing computer program instructions capable of being executed by a computer processor, the computer program instructions defining steps of:
    receiving video data generated by a source application;
    inputting the video data into a predictive model, the predictive model generating a prediction output for the data;
    identifying a subset of frames in the video data based on the prediction output;
    retaining the subset of frames as pre-processed data and discarding a remainder of frames; and
    transmitting the pre-processed data over a network to a server for processing of the data.

13. The computer-readable storage medium of claim 12, wherein inputting the data into a predictive model comprises inputting the data into a lightweight machine learning model.

14. The computer-readable storage medium of claim 12, the computer program instructions further defining the step of selecting a compression level based on the prediction output and compressing the second portion of the pre-processed data based on the compression level.

15. The computer-readable storage medium of claim 12, the computer program instructions further defining the step of selecting a compression level based on classifying and compressing a portion of the data based on the compression level.

16. The computer-readable storage medium of claim 12, the computer program instructions further defining the step of receiving video data, wherein the source application comprises a video capture application or a video compression application, or both.

17. The computer-readable storage medium of claim 16, the computer program instructions further defining the steps of:
    identifying a plurality of areas in the video data;
    cropping the video data based on the plurality of areas; and
    using the cropped video data as the pre-processed data.

* * * * *